United States Patent [19]
Tang et al.

[11] Patent Number: 6,037,392
[45] Date of Patent: *Mar. 14, 2000

[54] CORE/SHELL PARTICLES, AND CURABLE EPOXY RESIN COMPOSITIONS COMPRISING SAME

[75] Inventors: Qian Tang, Oberwil; Martin Roth, Hölstein; Dean Tallak Behm, Muttenz; Carl Walter Mayer, Riehen, all of Switzerland; Klaus Petschel, Grenzach-Wyhlen, Germany; Sameer Hosam Eldin, Courtepin, Switzerland

[73] Assignee: Ciba Specialty Chemicals Corp., Tarrytown, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/755,382

[22] Filed: Nov. 21, 1996

[30]  Foreign Application Priority Data

Nov. 29, 1995 [CH]  Switzerland ........................... 03387/95

[51] Int. Cl.⁷ .................................................. C08L 51/04
[52] U.S. Cl. ............................ 523/201; 525/529; 525/902
[58] Field of Search ..................... 523/201, 440, 523/464; 575/65, 529, 902

[56] References Cited

U.S. PATENT DOCUMENTS

| | | | |
|---|---|---|---|
| 3,856,883 | 12/1974 | Dickie et al. | 260/836 |
| 4,082,895 | 4/1978 | Backderf et al. | 525/902 |
| 4,277,384 | 7/1981 | Arkens | 525/902 |
| 4,351,875 | 9/1982 | Arkens | 428/290 |
| 4,393,172 | 7/1983 | Lindner et al. | 525/310 |
| 5,290,857 | 3/1994 | Ashida et al. | 525/65 |
| 5,332,781 | 7/1994 | Eldin et al. | 525/65 |
| 5,457,156 | 10/1995 | Liu et al. | 525/74 |
| 5,480,940 | 1/1996 | Khasat et al. | 525/290 |
| 5,622,813 | 4/1997 | Kanda et al. | 430/281.1 |
| 5,637,179 | 6/1997 | Nakayama et al. | 156/330 |

FOREIGN PATENT DOCUMENTS

| | | |
|---|---|---|
| 0390144 | 10/1990 | European Pat. Off. . |
| 0552799 | 7/1993 | European Pat. Off. . |
| 0578613 | 1/1994 | European Pat. Off. . |
| 4297220 | 5/1994 | Japan . |
| 8700188 | 1/1987 | WIPO . |

OTHER PUBLICATIONS

J.Y. Qian, 25th International Sample Technical Conference, Oct. 26–28, pp. 40–48, (1993).

J.Y. Qian, Journal of Applied Polymer Science, vol. 58, pp. 439–448, (1995).

*Primary Examiner*—Robert Dawson
*Assistant Examiner*—D. Aylward
*Attorney, Agent, or Firm*—David R. Crichton; Michele A. Kovaleski

[57] ABSTRACT

Core/shell particles comprising a core comprising an elastomer having a $T_G$ value of <0° C., onto which a shell of a crosslinked copolymer is grafted, where the proportion of the crosslinking component in the copolymer of the shell is from greater than 5 to 90% by weight, based on the total amount of the comonomers of the shell copolymer, are suitable as toughening agents for epoxy resins, with which they have good compatibility.

10 Claims, No Drawings

CORE/SHELL PARTICLES, AND CURABLE EPOXY RESIN COMPOSITIONS COMPRISING SAME

The present invention relates to novel core/shell particles comprising an elastomeric core and a crosslinked polymer shell grafted thereto, to epoxy resin compositions comprising the novel core/shell particles, and to coatings and moulded materials produced from the epoxy resin compositions by curing.

It is known, for example from EP-A-0 578 613, that addition of core/shell particles whose core comprises a rubberlike material to curable epoxy resin compositions can significantly improve the mechanical properties, in particular the flexural and impact strength, of cured epoxy resins. These core/shell particles basically comprise a crosslinked insoluble core to which an uncrosslinked or slightly crosslinked shell is grafted by methods known in polymer chemistry. The shell comprising the graft polymer has a higher glass transition temperature than the core. Typically, the glass transition temperature of the core is <0° C. and that of the shell is >25° C. After the epoxy resin has been cured by means of conventional curing agents, these core/shell particles are in the form of a separate, discontinuous phase in the resin. An important property of the graft polymers forming the shell is their compatibility with the epoxy resin, which is effected, for example, by swellability of the shell in the epoxy resin. Whereas, on the one hand, the swellability of the shell in the epoxy resin makes an essential contribution to good compatibility with the resin, it is, on the other hand, the principal factor responsible for an undesired increase in the viscosity of the curable epoxy resin mixture, which considerably restricts the applicability of such epoxy resin compositions.

PCT Application WO 87/00188 expresses certain reservations regarding an excessive increase in the viscosity on use of core/shell particles having a high-molecular-weight shell as modifiers for epoxy resins.

J. Y. Qian et al. in "The Preparation and Application of Core-Shell Latex Particles as Toughening Agents for Epoxies", 25th International SAMPE Conference, Oct. 26–28, 1993, describe the use of specific core/shell polymers for improving the fracture toughness in epoxy resins. Use is made, inter alia, of a core/shell polymer whose shell is crosslinked and, based on all comonomers, comprises 5% by weight of copolymerized divinylbenzene. Compared with the other core/shell copolymers used, whose shell is not crosslinked, no improvement of the fracture toughness in epoxy resins is achieved.

J. Y. Qian et al. in Journal of Applied Polymer Science, Vol. 58, pages 439–448 (1995), confirm the above comments regarding the use of core/shell polymers comprising 5% by weight of copolymerized divinylbenzene in the shell. It is even noted therein that a crosslinked shell adversely affects the fracture toughness.

In JP Application Hei 4-297220, transparent thermoplastics are added to core/shell polymers comprising up to 5% by weight of a crosslinking cocomponent in the shell in order to improve the impact strength and retain the transparency.

Surprisingly, it has now been found that use of certain core/shell particles which have a shell comprising a relatively highly crosslinked polymer, in particular use of epoxy resins, gives processing advantages, since the novel core/shell copolymers do not significantly increase the viscosity of the liquid or molten epoxy resins. Epoxy resin compositions modified in this way allow simpler application conditions and a broader range of potential applications.

The present invention thus relates to novel core/shell particles comprising a core comprising an elastomer having a $T_G$ value of <0° C. onto which a shell of a crosslinked copolymer is grafted, where the proportion of the crosslinking component in the copolymer of the shell is from greater than 5 to 90% by weight, based on the total amount of comonomers in the shell copolymer.

The core of the novel core/shell particles, which comprises an elastomer, can comprise, for example, a polybutadiene, polybutadiene derivative, polyisoprene, polychloroisoprene, silicone rubber, polysulfide, poly(meth) acrylate or a copolymer or terpolymer thereof with styrene or acrylonitrile. Such elastomers are known and are also commercially available, for example a polybutadiene latex under the name Baystal® S polybutadiene (Bayer AG). The core of the novel core/shell particles preferably comprises a crosslinked elastomer, for example polybutadiene, poly(meth)acrylate or a copolymer or terpolymer thereof with styrene, having a $T_G$ value of <-10° C.

In particular, the core of the novel core/shell particles comprises a polybutadiene or poly(meth)acrylate.

In the novel core/shell particles, the amount of the core, based on the total core/shell particles, is generally 10–90% by weight, preferably 20–80% by weight, in particular 30–70% by weight.

The shell of the novel core/shell particles comprises a crosslinked copolymer based on vinyl monomers, which can contain functional groups, for example glycidyl, hydroxyalkyl, amino or amido groups, and based on polyfunctional (meth)acrylates of aliphatic polyols, bisphenol diglycidyl ether di(meth)acrylates, di(meth)acrylates of ethoxylated bisphenols, products of the addition reaction of (meth)acrylic acid with di- or polyepoxide compounds other than bisphenol diglycidyl ethers, or based on allyl (meth) acrylate or divinylbenzene as crosslinking component and comonomer. It is also possible to use mixtures of the various vinyl monomers and the crosslinking components.

Examples of suitable vinyl monomers are acrylic acid, methacrylic acid and derivatives thereof, for example (meth)acrylates, (meth)acrylates containing epoxide groups, for example glycidyl (meth)acrylate, (meth)acrylates containing hydroxyl groups, for example hydroxyethyl- or hydroxypropyl(meth)acrylates, or polyethylene glycol- or polypropylene glycol-derived (meth)acrylates of the formula I

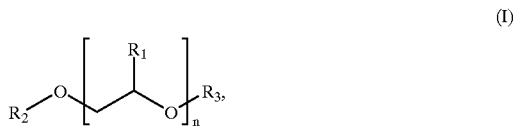

(I)

in which either $R_2$ or $R_3$ is the

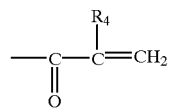

radical and the other radical is —H or an alkyl, $R_1$ and $R_4$ are each —H or —$CH_3$, and n is a number from 2 to 30, monomers containing amido groups, for example (meth)acrylamides, monomers containing amino groups, for example dimethylaminoethyl (meth)acrylate, or vinylpyridine, styrene, vinyl ether or acrylonitrile.

The vinyl monomers are preferably (meth)acrylic acid, (meth)acrylates, polyethylene glycol- or polypropylene glycol-derived (meth)acrylates of the formula I, styrene, acrylonitrile or glycidyl (meth)acrylate.

In particular, the vinyl monomers used for the preparation of the shell are at least one polyethylene glycol- or polypropylene glycol-derived (meth)acrylate of the formula I.

Suitable crosslinking components, i.e. monomers containing at least two vinyl groups in the molecule, are also mixtures of at least two vinyl monomers which can react with one another via a functional group during preparation of the shell, for example mixtures of (meth)acrylic acid and glycidyl methacrylate.

The crosslinking component used for the preparation of the shell of the novel core/shell particles is preferably a di(meth)acrylate of ethylene glycol, propylene glycol, butylene glycol or a higher homologue thereof having up to 30 recurring structural units of the formula

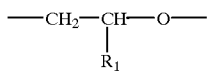

in the molecule, in which $R^1$ is —H, —$CH_3$ or —$C_2H_5$, furthermore 1,1,1-trimethylolpropane tri(meth)acrylate, bisphenol A-diglycidyl ether di(meth)acrylate or allyl methacrylate.

In particular, the crosslinking component employed in the preparation of the shell is ethylene glycol di(meth)acrylate or a higher homologue thereof.

In the novel core/shell particles, the amount of the shell, based on the core/shell particles, is generally 90–10% by weight, preferably 80–20% by weight, in particular 70–30% by weight.

In the shell itself, the proportion of the crosslinking component is preferably 6–60% by weight, in particular 10–50% by weight, based on the total amount of comonomers in the shell polymer.

The novel core/shell particles are prepared by methods known per se. Preference is given to a preparation as emulsion polymer in an aqueous medium. In this case, the core is prepared first as an emulsion polymer, and a shell is then grafted on. After the polymerization, the core/shell particles are in the form of an aqueous latex. This can either be processed further as a latex, isolated in solid form by, for example, spraydrying or lyophilization or dispersed in an organic solvent by solvent exchange.

The size of the core/shell particles can vary within broad limits and is generally from 0.05 to 30 µm.

As mentioned at the outset, the novel core/shell particles are preferably suitable as toughening agents for epoxy resins, since they give stable epoxy resin dispersions of low viscosity with the epoxy resins and thus have improved processing properties.

The present invention thus also relates to epoxy resin compositions which comprise
(a) an epoxy resin or epoxy resin mixture containing an average of more than one 1,2-epoxide group in the molecule,
(b) core/shell particles comprising a core comprising an elastomer having a $T_G$ value of <0° C. onto which a shell of a crosslinked copolymer is grafted, where the proportion of the crosslinking component in the copolymer of the shell is from greater than 5 to 90% by weight, based on the total amount of the comonomers of the shell copolymer, and
(c) a curing agent or a curing catalyst for the epoxy resin component (a).

Suitable epoxy resins (a) for the preparation of the novel epoxy resin compositions are the usual epoxy resins in epoxy resin technology. Examples of epoxy resins are the following:

I) Polyglycidyl and poly(β-methylglycidyl) esters, obtainable by reacting a compound containing at least two carboxyl groups in the molecule and epichlorohydrin or β-methylepichlorohydrin. The reaction is expediently carried out in the presence of bases.

Suitable compounds containing at least two carboxyl groups in the molecule are aliphatic polycarboxylic acids. Examples of such polycarboxylic acids are oxalic acid, succinic acid, glutaric acid, adipic acid, pimelic acid, suberic acid, azelaic acid or dimerized or trimerized linoleic acid. However, it is also possible to use cycloaliphatic polycarboxylic acids, for example tetrahydrophthalic acid, 4-methyltetrahydrophthalic acid, hexahydrophthalic acid or 4-methylhexahydrophthalic acid. It is also possible to use aromatic polycarboxylic acids, for example phthalic acid, isophthalic acid or terephthalic acid.

(II) Polyglycidyl or poly(β-methylglycidyl) ethers obtainable by reacting a compound containing at least two free alcoholic hydroxyl groups and/or phenolic hydroxyl groups and epichlorohydrin or β-methylepichlorohydrin under alkaline conditions, or in the presence of an acidic catalyst followed by treatment with alkali.

The glycidyl ethers of this type are derived, for example, from acyclic alcohols, such as from ethylene glycol, diethylene glycol and higher poly(oxyethylene) glycols, propane-1,2-diol or poly(oxypropylene) glycols, propane-1,3-diol, butane-1,4-diol, poly(oxytetramethylene) glycols, pentane-1,5diol, hexane-1,6-diol, hexane-2,4,6-triol, glycerol, 1,1,1-trimethylol-propane, pentaerythritol, sorbitol, or from polyepichlorohydrins.

However, they can alternatively be derived, for example, from cycloaliphatic alcohols, such as 1,4-cyclohexanedimethanol, bis(4-hydroxycyclohexyl)methane or 2,2-bis(4-hydroxy-cyclohexyl)propane, or contain aromatic rings, such as N,N-bis(2-hydroxyethyl)aniline or p,p'-bis(2-hydroxyethylamino)diphenylmethane.

The glycidyl ethers can alternatively be derived from monocyclic phenols, for example from resorcinol or hydroquinone, or they can be based on polycyclic phenols, for example bis(4-hydroxyphenyl)methane, 4,4'-dihydroxybiphenyl, bis(4-hydroxyphenyl) sulfone, 1,1,2,2-tetrakis(4-hydroxyphenyl)ethane, 2,2-bis(4-hydroxyphenyl)propane, 2,2-bis(3,5-dibromo-4-hydroxyphenyl)propane, or from novolaks obtainable by condensation of aldehydes, such as formaldehyde, acetaldehyde, chloral or furfuraldehyde, with phenols, such as phenol, or with phenols which are substituted on the ring by chlorine atoms or $C_1$–$C_9$ alkyl groups, for example 4-chlorophenol, 2-methylphenol or 4-tert-butylphenol, or by condensation with bisphenols of the abovementioned type.

III) Poly(N-glycidyl) compounds obtainable by dehydrochlorination of the products of the reaction of epichlorohydrin with amines containing at least two aminic hydrogen atoms. These amines are, for example, anilin, n-butylamine, bis(4-aminophenyl)methane, m-xylylenediamine or bis(4-methylaminophenyl) methane.

However, the poly(N-glycidyl) compounds also include triglycidyl isocyanurate, N,N'-diglycidyl derivatives of cycloalkyleneureas, such as ethyleneurea or 1,3-propyleneurea, and diglycidyl derivatives of hydantoins, such as of 5,5-dimethylhydantoin.

IV) Poly(S-glycidyl) compounds, for example di-S-glycidyl derivatives of dithiols, for example ethane-1,2-dithiol or bis(4-mercaptomethylphenyl) ethers.

V) Cycloaliphatic epoxy resins, for example bis(2,3-epoxycyclopentyl) ether, 2,3-epoxycyclopentyl glycidyl ether, 1,2-bis(2,3-epoxycyclopentoxy)ethane or 3,4-epoxycyclohexylmethyl 3',4'-epoxycyclohexanecarboxylate.

However, it is also possible to use epoxy resins in which the 1,2-epoxide groups are bonded to different hetero atoms or functional groups; these compounds include, for example, the N,N,O-triglycidyl derivative of 4-aminophenol, the glycidyl ether glydicyl ester of salicylic acid, N-glycidyl-N'-(2-glycidyloxypropyl)-5,5-dimethylhydantoin or 2-glycidyloxy-1,3-bis(5,5-dimethyl-1-glycidylhydantoin-3-yl)propane.

The novel epoxy resin compositions are preferably prepared using a liquid or solid polyglycidyl ether or ester, in particular a liquid or solid bisphenol diglycidyl ether or a solid or liquid diglycidyl ester of a cycloaliphatic or aromatic dicarboxylic acid, or a cycloaliphatic epoxy resin. It is also possible to use mixtures of epoxy resins.

Suitable solid polyglycidyl ethers and esters are compounds having melting points above from room temperature to about 250° C. The melting points of the solid compounds are preferably in the range from 50 to 150° C. Solid compounds of this type are known and some are commercially available. Solid polyglycidyl ethers and esters which can be used also include the advancement products of liquid polyglycidyl ethers and esters.

In particular, the novel epoxy resin compositions comprise a liquid polyglycidyl ether or ester.

Component (b) in the novel epoxy resin compositions preferably comprises core/shell particles in which the core comprises a crosslinked elastomer, for example polybutadiene, a poly(meth)acrylate or a copolymer or terpolymer thereof with styrene, having a $T_G$ value of $<-10°$ C.

In particular, the novel epoxy resin compositions comprise core/shell particles in which the core comprises a polybutadiene or poly(meth)acrylate.

Preference is furthermore given as component (b) to core/shell particles which have a shell of a crosslinked copolymer in which the proportion of the crosslinking component in the copolymer is 6–60% by weight, in particular 10–50% by weight, based on the total amount of the shell polymer.

Preference is furthermore given as component (b) to core/shell particles in which the shell comprises a crosslinked copolymer based on vinyl monomers, which can contain functional groups, and based on polyfunctional (meth)acrylates of aliphatic polyols, bisphenol diglycidyl ether di(meth)acrylates, di(meth)acrylates of ethoxylated bisphenols, products of the addition reaction of (meth) acrylic acid with di- or polyepoxide compounds other than bisphenol diglycidyl ethers, or based on allyl (meth)acrylate or divinylbenzene as crosslinking components and comonomers.

The shell of the core/shell particles preferably comprises a crosslinked copolymer based on the vinyl monomers (meth)acrylic acid, (meth)acrylates, (meth)acrylates derived from polyethylene glycol or polypropylene glycol, of the formula I

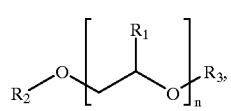
(I)

in which either $R_2$ or $R_3$ is the radical

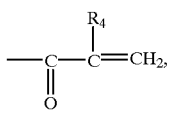

and the other radical is —H or alkyl, R, and $R_4$ are each —H, —CH$_3$ or —C$_2$H$_5$, and n is a number from 2 to 30, styrene, acrylonitrile or glycidyl (meth)acrylate.

In particular, the shell of the core/shell particles in the novel epoxy resin compositions comprises at least one crosslinked (meth)acrylate of the formula I derived from polyethylene glycol or polypropylene glycol.

Very particularly, the shell of the core/shell particles comprises a crosslinked copolymer which comprises a di(meth)acrylate of ethylene glycol, propylene glycol, butylene glycol or a higher homologue thereof having up to 30 recurring structural units of the formula

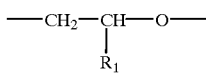

in the molecule, in which $R^1$ is —H, —CH$_3$, or—C$_2$H$_5$, or 1,1,1-trimethylolpropane tri(meth)acrylate, bisphenol A-diglycidyl ether di(meth)acrylate or allyl methacrylate as crosslinking component.

The proportion of component (b) is preferably 5–30% by weight, in particular 5–25% by weight.

As curing agent (c), the novel epoxy resin compositions can comprise the conventional curing agents used in epoxy resin technology, for example polycarboxylic acids and anhydrides thereof, polyamines, polyaminoamides, adducts containing amino groups, aliphatic or aromatic polyols or catalytically active curing agents.

Examples of suitable polycarboxylic acids which may be mentioned are the following: aliphatic polycarboxylic acids, such as maleic acid, oxalic acid, succinic acid, nonyl- or dodecylsuccinic acid, glutaric acid, adipic acid, pimelic acid, suberic acid, azelaic acid, or dimerized or trimerized linoleic acid, cycloaliphatic polycarboxylic acids, for example tetrahydrophthalic acid, methylendomethylenetetrahydrophthalic acid, hexachloroendomethylenetetrahydrophthalic acid, 4-methyltetrahydrophthalic acid, hexahydrophthalic acid or 4-methylhexahydrophthalic acid, or aromatic polycarboxylic acids, for example phthalic acid, isophthalic acid, terephthalic acid, trimellitic acid, pyromellitic acid or benzophenone-3,3',4,4'-tetracarboxylic acid, and the anhydrides of said polycarboxylic acids.

Polyamines which can be employed for the curing are aliphatic, cycloaliphatic, aromatic or heterocyclic amines, for example ethylenediamine, propane-1,2-diamine, propane-1,3-diamine, N,N-diethylethylenediamine, hexamethylenediamine, diethylenetriamine, triethylenetetramine, tetraethylenepentamine, N-(2-hydroxyethyl)-, N-(2-hydroxypropyl)- and N-(2-cyanoethyl)diethyltriamine, 2,2,4-trimethylhexane-1,6-diamine, 2,3,3-trimethylhexane-1,6-diamine, N,N-dimethyl- and N,N-diethylpropane-1,3-diamine, ethanolamine, m- and p-phenylenediamine, bis(4-aminophenyl)methane, anilin-formaldehyde resin, bis(4-amino-phenyl) sulfone, m-xylylenediamine, bis(4-aminocyclohexyl)methane, 2,2-bis(4-aminocyclo-hexyl)propane, 2,2-bis(4-amino-3-methylcyclohexyl)propane, 3-aminomethyl-3,5,5-trimethyl-cyclohexylamine (isophoronediamine) and N-(2- aminoethyl)piperazine, and polyaminoamides which can be employed are, for example, those derived from aliphatic polyamines and dimerized or trimerized fatty acids.

Examples of suitable polyaminoamides are the reaction products obtained by reacting polycarboxylic acids, preferably dimerized fatty acids, with polyamines in a molar excess, as described, for example, in Handbook of Epoxy Resins, 1967, pages 10-2 to 10—10, by H. Lee and K. Neville. Amino-containing adducts of an amine and a polyepoxide compound are likewise known as curing agents for epoxy resins and can be employed for the curing of the novel epoxy resin compositions; they are obtained, for example, by reacting epoxy resins with polyamines in an equivalent excess. Amino-containing adducts of this type are described in greater detail, for example, in U.S. Pat. Nos. 3,538,184; 4,330,659, 4,500,582 and 4,540,750. Examples of suitable aliphatic polyols for the curing of the novel epoxy resin compositions are ethylene glycol, diethylene glycol and higher poly(oxyethylene) glycols, propane-1,2diol or poly (oxypropylene) glycols, propane-1,3-diol, butane-1,4-diol, poly(oxytetramethylene) glycols, pentane-1,5-diol, hexane-1,6-diol, hexane-2,4,6-triol, glycerol, 1,1,1-trimethylolpropane, pentaerythritol, sorbitol, N,N-bis(2-hydroxyethyl) anilin or p,p'-bis(2-hydroxyethyl-amino)diphenylmethane.

Examples of suitable aromatic polyols for curing are monocyclic phenols, such as resorcinol or hydroquinone, or polycyclic phenols, such as bis(4-hydroxyphenyl)methane, 4,4'-dihydroxybiphenyl, bis(4-hydroxyphenyl) sulfone, 1,1, 2,2-tetrakis(4-hydroxyphenyl)ethane, 2,2-bis(4-hydroxyphenyl)propane, 2,2-bis(3,5-dibromo-4-hydroxyphenyl)propane and novolaks obtainable by condensation of aldehydes, such as formaldehyde, acetaldehyde, chloral or furfuraldehyde, with phenols, such as phenol, or with phenols which are substituted on the ring by chlorine atoms or $C_1$–$C_9$ alkyl groups, for example 4-chlorophenol, 2-methylphenol or 4-tert-butylphenol, or by condensation with bisphenols of the type mentioned above.

It is also possible to use catalytically active curing agents for curing the novel epoxy resin compositions, such as tertiary amines, for example 2,4,6-tris (dimethylaminomethyl)phenol and other Mannich bases, N-benzyldimethylamine and triethanolamine; alkali metal alkoxides of alcohols, for example sodium alkoxides of 2,4-dihydroxy-3-hydroxymethyl-pentane; tin salts of alkanoic acids, for example tin octanoate; Friedel-Crafts catalysts, for example boron trifluoride and complexes thereof, for example boron trifluoride/amine complexes, and chelates obtained by reacting boron trifluoride with, for example, 1,3-diketones; sulfonium salts, as disclosed, for example, in European Patent 0 379 464, U.S. Pat. No. 5,013,814, European Patent 0 580 552 and U.S. Pat. No. 5,374,697, or heterocyclic ammonium salts, for example quinolinium salts, mixed with benzopinacol, as mentioned, for example, in EP-A 0 066 543.

The curing agent for the novel epoxy resin compositions is preferably a polycarboxylic acid or an anhydride thereof, a polyamine, dicyandiamide or a catalytically acting curing agent.

In particular, the curing agent for the novel epoxy resin compositions is a polycarboxylic anhydride or a catalytically acting curing agent, for example a sulfonium salt.

The amount of curing agent employed depends on the chemical nature of the curing agent and on the desired properties of the curable mixture and of the cured product. The maximum to 1.1 equivalents of carboxyl groups or anhydride groups are usually used per epoxide equivalent. If the curing agent employed is a polyphenol, from 0.75 to 1.25 phenolic hydroxyl groups are used per epoxide equivalent. Catalytically acting curing agents are generally employed in amounts of from 0.1 to 40 parts by weight per 100 parts by weight of epoxy resin.

The novel epoxy resin compositions can also comprise the usual fillers and reinforcing materials in epoxy resin technology. Examples of suitable fillers are the following: mineral and fibrous fillers, such as quartz powder, fused silica, aluminium oxide, glass powder, mica, kaolin, dolomite, graphite, carbon black and carbon fibres and textile fibres. Preferred fillers are quartz powder, fused silica, aluminium oxide and dolomite. Suitable reinforcing materials are, for example, glass fibres and carbon fibres.

The novel epoxy resin compositions are prepared by methods known per se, such as with the aid of known mixing equipment, for example stirrers, compounders, rolls or, in the case of solid substances, in dry mixers.

The curing of the novel epoxy resin compositions to give mouldings, coatings or the like is carried out in the usual manner for epoxy resin technology, as described, for example, in "Handbook of Epoxy Resins", 1967, by H. Lee and K. Neville.

The novel epoxy resin compositiones are highly suitable as casting resins, laminating resins, adhesives, moulding compounds, coating compositions and as encapsulation systems for electrical and electronic components, preferably as encapsulating systems or coating compositions as well as casting resins, laminating resins or adhesives.

In particular the novel epoxy resin compositions are suitable as encapsulating systems or coating compositions, for instance for voltage transformer or electrical isolators having good impact strengths and fracture toughnesses for middle and high voltage ranges. Suitable encapsulating systems or coating compositions therefor comprises (a) an epoxy resin or epoxy resin mixture containing an average of more than one 1,2-epoxide group in the molecule, (b) core/shell particles comprising a core comprising an elastomer having a $T_G$ value of <0° C. onto which a shell of a crosslinked copolymer is grafted, where the proportion of the crosslinking component in the copolymer of the shell is from 5 to 90% by weight, based on the total amount of the comonomers of the shell copolymer, (c) a curing agent or a curing catalyst for the epoxy resin component (a), and (d) at least one mineral filler suitable in the epoxy resin technology.

The particle size of the core/shell particles in the inventive encapsulating systems or coating compositions is preferably not greater than 30 μm.

Usual mineral fillers for the epoxy resin technology are for instance quartz powder, fused silica, aluminium oxide, titanium dioxide, mica, kaolin, dolomite or graphite. Other usual fillers in the epoxy resin technology are carbon black, glass powder, carbon fibres and textile fibres. The amount of these fillers generally runs to 40 to 80% by weight, relating to the complete weight of the inventive encapsulating system or coating composition. The upper amount of the fillers is limited by the suitability of the inventive encapsulating system or coating composition as casting resin.

The fillers on the inventive encapsulating systems or coating compositions have preferably a particle size of not greater than 250 μm.

Another preferred embodiment of the present invention is the use of the novel epoxy resin composition as casting resin compositions for the manufacture of castings, for instance as troughs, douche cups, plates with functional elements, apparatus boxes or valve elements.

Therefore, the present invention also relates to epoxy casting resin compositions comprising (a) an epoxy resin or epoxy resin mixture containing an average of more than one 1,2-epoxide group in the molecule, (b) core/shell particles comprising a core comprising an elastomer having a $T_G$ value of <0° C. onto which a shell of a crosslinked copolymer is grafted, where the proportion of the crosslinking component in the copolymer of the shell is from greater than 5 to 90% by weight, based on the total amount of the comonomers of the shell copolymer, (c) a curing agent or a curing catalyst for the epoxy resin component (a), and (d) at least one mineral filler suitable in the epoxy casting resin technology.

Usual mineral fillers in the epoxy resin casting technology are for instance quartz powder, fused silica, aluminium oxide, titanium dioxide, mica, kaolin, dolomite, graphite, granite, sand and other particular mineral additives. Other usual fillers in the epoxy casting resin technology are for example carbon black, glass powder, carbon fibres and textile fibres. The amount of these fillers generally runs to 40 to 85% by weight, relating to the complete weight of the inventive eopxy casting composition. The upper amount of the fillers is limited by the suitability of the inventive composition as casting resin.

The present invention also relates to the moulded materials, coatings or adhesive bond systems produced from the novel epoxy resin compositions.

In the examples below, the following abbreviations are used for the substances employed:

| | |
|---|---|
| Polybutadiene latex | PBdL |
| n-Butyl acrylate | BA |
| Methyl methacrylate | MMA |
| Acrylonitrile | AN |
| Glycidyl methacrylate | GMA |
| Ethylene glycol dimethacrylate | EGDMA |
| tert-Dodecyl mercaptan | t-DM |
| Ammonium persulfate | APS |
| Sodium dodecylsulfate | SDS |
| 1-Methylimidazole | MeIm |
| Benzyldimethylamine | BDMA |
| Quartz powder | QP |
| Deionized water | DW |

Preparation of a core/shell polymer

EXAMPLE A 51.2 g of PBdL (Baystal® S polybutadiene 2004, Bayer AG), having a solids content of 59% by weight, and 98.8 g of DW are introduced under nitrogen into a 350 ml sulfonation flask fitted with glass anchor stirrer, thermometer, gas connection and two metering connections. The mixture is stirred and heated to 80° C. (internal temperature). The following monomer mixture and initiator/emulsifier solution are metered in over the course of 50 minutes (min).

| Monomer mixture | | Initiator/emulsifier solution | |
|---|---|---|---|
| MMA | 24 g | APS | 0.15 g |
| EGDMA | 6 g | SDS | 0.5 g |
| | | DW | 30 g |

After the addition, the mixture is stirred for a further 2 hours (h) at 80° C. and polymerized. The reaction emsulsion is then cooled to room temperature (RT) and filtered through a paper filter. The resultant emulsion, having a solids content of 27% by weight and particle sizes of 0.5–1.7 μm, determined by the Fraunhofer diffraction method, published in Modem Methods of Particle Size Analysis, and containing 20% by weight of the crosslinking component in the shell polymer, based on the amount of monomer in the shell polymer, is employed as toughening agent.

EXAMPLE B

Analogously to Example A, the monomer mixture and initiator/emulsifier solution shown below are metered into the mixture of 51.2 g of PBdL and 98.8 g of DW. After the addition, the mixture is stirred and polymerized for a further 6 h at 80° C. Solids content: 26.8% by weight.

Proportion of crosslinking component in the shell: 15% by weight.

| Monomer mixture | | Initiator/emulsifier solution | |
|---|---|---|---|
| MMA | 21 g | APS | 0.15 g |
| EGDMA | 4.5 g | SDS | 0.5 g |
| Bisomer PPM6E*⁾ | 4.5 g | DW | 30 g |
| t-DM | 0.15 g | | |

*⁾Bisomer PPM6E is a polypropylene monomethacrylate containing an average of 6 propylene glycol units, obtainable from British Petroleum.

EXAMPLE C

Analogously to Example A, the monomer mixture and initiator/emulsifier solution shown below are metered into the mixture of 51.2 g of PBdL and 98.8 g of DW. After the addition, the mixture is stirred for a further 6 h at 80° C. Solids content: 28.0% by weight. Proportion of crosslinking component in the shell: 15% by weight.

| Monomer mixture | | Initiator/emulsifier solution | |
|---|---|---|---|
| MMA | 21 g | APS | 0.15 g |
| EGDMA | 4.5 g | SDS | 0.5 g |
| AN | 4.5 g | DW | 30 g |
| t-DM | 0,15 g | | |

EXAMPLE D

Analogously to Example A, the monomer mixture and initiator/emulsifier solution shown below are metered into the mixture of 51.2 g of PBdL and 98.8 g of DW. After the addition, the mixture is stirred for a further 6 h at 80° C. Solids content: 26.6% by weight. Proportion of crosslinking component in the shell: 15% by weight.

| Monomer mixture | | Initiator/emulsifier solution | |
|---|---|---|---|
| MMA | 27 g | APS | 0.15 g |
| Sartomer 350*) | 3 g | SDS | 0.5 g |
| t-DM | 0.15 g | DW | 30 g |

*)Sartomer 350 comprises trimethylolpropane trimethacrylate

EXAMPLE E

Analogously to Example A, the monomer mixture and initiator/emulsifier solution shown below are metered into the mixture of 51.2 g of PBdL and 98.8 g of DW. After the addition, the mixture is stirred for a further 6 h at 80° C. Solids content: 28.6% by weight. Proportion of crosslinking component in the shell: 15% by weight.

| Monomer mixture | | Initiator/emulsifier solution | |
|---|---|---|---|
| MMA | 21 g | APS | 0.15 g |
| EGDMA | 4.5 g | SDS | 0.5 g |
| GMA | 4.5 g | DW | 30 g |
| t-DM | 0.15 g | | |

EXAMPLE F

Analogously to Example A, the monomer mixture and initiator/emulsifier solution shown below are metered into the mixture of 51.2 g of PBdL and 98.8 g of DW over the course of 2 h. After the addition, the mixture is stirred and polymerized for a further 6 h at 80° C. Solids content: 26.5% by weight. Proportion of crosslinking component in the shell: 15% by weight.

| Monomer mixture | | Initiator/emulsifier solution | |
|---|---|---|---|
| MMA | 21 g | APS | 0.15 g |
| Ebecryl 600*) | 4.5 g | SDS | 0.5 g |
| Bisomer PPM6E | 4.5 g | DW | 30 g |
| t-DM | 0.15 g | | |

*)Ebecryl 600 is a diacrylate of bisphenol A diglycidyl ether

EXAMPLE G

Analogously to Example A, the monomer mixture and initiator/emulsifier solution shown below are metered into the mixture of 51.2 g of PBdL and 98.8 g of DW over the course of 2 h. After the addition, the mixture is stirred for a further 6 h at 80° C. Solids content: 27.9% by weight. Proportion of crosslinking component in the shell: 15% by weight.

| Monomer mixture | | Initiator/emulsifier solution | |
|---|---|---|---|
| MMA | 21 g | APS | 0.15 g |
| Ebecryl 600 | 4.5 g | SDS | 0.5 g |
| Bisomer PPM6E | 4.5 g | DW | 30 g |

EXAMPLE H

Analogously to Example A, the monomer mixture and initiator/emulsifier solution shown below are metered into the mixture of 76.8 g of PBdL and 148.2 g of DW over the course of 1.25 h. After the addition, the mixture is stirred for a further 4.75 h at 80° C. Solids content: 28.3% by weight. Proportion of crosslinking component in the shell: 6% by weight

| Monomer mixture | | Initiator/emulsifier solution | |
|---|---|---|---|
| MMA | 35.55 g | APS | 0.45 g |
| EGDMA | 2.7 g | SDS | 1.5 g |
| Bisomer PPM6E | 6.75 g | DW | 45 g |

EXAMPLE I 70 g of DW, 19.6 g of BA, 0.4 g of EGDMA, 0.05 g of SDS and 0.1 g of APS are introduced under nitrogen into a 350 ml sulfonation flask fitted with glass anchor stirrer, thermometer, gas connection and two metering connections. The mixture is stirred and heated to 70° C. (internal temperature). After 0.5 h, the core monomer mixture and emulsifier solution shown below are metered in over the course of 1 h. 10 min after this addition, the shell monomer mixture and emulsifier solution shown below are metered in over the course of 1 h. After 0.5 h, a solution of 0.03 g of APS in 1 g of DW is added. After 1 h, a further solution of 0.03 g of APS in 1 g of DW is added. The mixture is stirred and polymerized for a further 2 h at 70° C. The emulsion is then cooled to RT and filtered through a paper filter. The resultant emulsion, having a solids content of 37.5.% by weight and particle sizes of 0.2–0.7 mm, with a proportion of 6% by weight of crosslinking component in the shell polymer, based on the amount of monomer in the shell polymer, is employed as toughening agent.

| | | Emulsifier solution | |
|---|---|---|---|
| Core monomer mixture | | | |
| BA | 58.8 g | SDS | 0.75 g |
| EGDMA | 1.2 g | DW | 84 g |
| Shell monomer mixture | | | |
| MMA | 63.2 g | SDS | 0.75 g |
| EGDMA | 4.8 g | DW | 84 g |
| Bisomer PPM6E | 12 g | | |

EXAMPLE J 100 g of DW, 19.6 g of BA and 0.4 g of EGDMA are introduced under nitrogen into a 350 ml sulfonation flask fitted with glass anchor stirrer, thermometer, gas connection and two metering connections. The mixture is stirred and heated to 70° C. (internal temperature), and 5 ml of a 2% by weight aqueous solution of ammonium persulfate (APS) are added. After 0.5 h, the core monomer mixture and emulsifier solution shown below are metered in over the course of 1 h. After this addition, the shell monomer mixture shown below is metered in over the course of 1 h. After 0.5 h, 2 ml of a solution of 0.03 g of APS in 1 g of DW is added. After 1 h, a further 5 ml of a 2% by weight aqueous solution of APS are added. The mixture is stirred and polymerized for a further 3 h at 70° C. The emulsion is then cooled to RT and filtered through a paper filter. The resultant emulsion, having a solids content of 46% by weight, with a proportion of 6% by weight of crosslinking component in the shell polymer, based on the amount of monomer in the shell polymer, is employed as toughening agent.

|  |  | Emulsifier solution |  |
|---|---|---|---|
| Core monomer mixture |  |  |  |
| BA | 58.8 g | SDS | 0.75 g |
| EGDMA | 1.2 g | DW | 26.5 g |
| Shell monomer mixture |  |  |  |
| MMA | 63.2 g | SDS | 0.75 g |
| EGDMA | 4.8 g | DW | 26.5 g |
| Bisomer PPM6E | 12 g |  |  |

EXAMPLE K

Analogously to Example A, the following monomer mixture and initiator/emulsifier solution are metered into the mixture of 256 g of PBdL and 494 g of DW over the course of 2 h.

| Monomer mixture |  | Initiator/emulsifier solution |  |
|---|---|---|---|
| MMA | 105 g | APS | 0.75 g |
| EGDMA | 22.5 g | SDS | 2.5 g |
| Bisomer PPM6E | 22.5 g | DW | 150 g |

After the addition, the mixture is stirred for a further 4 h at 80° C. The resultant emulsiory has a solids content of 15% by weight and a proportion of 6% by weight of crosslinking component in the shell polymer, based on the amount of monomer in the shell polymer.

400 g of this emulsion are spray-dried by means of a Büchi B 191 Mini Spray Dryer (inlet temperature 120° C., outlet temperature 70°, spray flow 600 I/h).
Preparation of a core/shell suspension in the epoxy resin, and curing thereof

Example 1

81.48 g of the aqueous emulsion prepared in Example A are added to 198 g of bisphenol A diglycidyl ether having an epoxide content of 5.4 equivalents/kg, and the components are mixed by means of a stirrer. The water in the mixture is removed by distillation under a high vacuum at 70° C. (bath temperature) in a rotary evaporator. The remaining water is removed in a high vacuum. The resultant modified epoxy resin, having a viscosity (Brookfield) of 1710 mPa·s at 40° C., is used to formulate a casting resin composition by mixing together the following components:

| Modified epoxy resin from Example 1 | 75 g |
|---|---|
| Melm | 0.02 g |
| Millisil ® QM W12*⁾ | 123.8 g |
| 15% by weight solution of phenyldibenzyl-sulfonium hexafluoroantimonate in dibutyl phthalate | 7.5 g |
| Byk ® A500 (Byk Chemicals)**⁾ | 2 drops |

*⁾Quartz powder from Quarzwerke AG, Frechen
**⁾Defoamer from Byk Chemicals

In order to remove included air bubbles, the casting resin composition is evacuated under a high vacuum at RT. The casting resin composition is poured at 80° C. into a mould measuring 13×13×0.4 cm. Curing is carried out for 1 h at 100° C. and subsequently for 1 h at 140° C.

The mechanical properties are tested by the following methods: flexural test (in accordance with ISO R 178/93) and double torsion (in accordance with Ciba-Geigy test PM 216/89).***⁾

| Flexural test | Modulus of elasticity (MPa) | 8672 |
|---|---|---|
|  | σ-fracture (MPa) | 91 |
| Double torsion: | G1c (J/m$^2$) | 307 |
|  | K1c (MPa.m$^{½}$) | 1.71 |

***⁾In the double torsion test, the fracture toughness is measured by a method published in Electrical Manufacturing & Coil Winding, 1994.

Example 2

Analogously to Example 1, a modified epoxy resin prepared from 44.78 g of the aqueous emulsion prepared in Example B and 108 g of bisphenol A diglycidyl ether having an epoxide content of 5.4 equivalents/kg is prepared. The modified epoxy resin, which has a viscosity (Brookfield) of 2500 mPa·s at 40° C., is used to formulate a casting resin composition by mixing together the following components:

| Modified epoxy resin from Example 2 | 75 g |
|---|---|
| Melm | 0.02 g |
| Millisil QM W12 | 123.8 g |
| Phenyldibenzylsulfonium hexafluoroantimonate (15% by weight solution in dibutyl phthalate) | 7.5 g |
| Byk ® A500 | 2 drops |

Processing as in Example 1.

| Flexural test: | Modulus of elasticity (MPa) | 8161 |
|---|---|---|
|  | σ-fracture (MPa) | 98 |
| Double torsion: | G1c (J/m$^2$) | 360 |
|  | K1c (MPa.m$^{½}$) | 1.80 |

Example 3

Analogously to Example 1, a modified epoxy resin is prepared from 78.57 g of the aqueous emulsion prepared in Example C and 198 g of diglycidyl hexahydrophthalate having an epoxide content of 6.04 equivalents/kg. The modified epoxy resin, which has a viscosity (Brookfield) of 4800 mPa·s at 40° C., is used to formulate a casting resin composition by mixing together the following components:

| Modified epoxy resin from Example 3 | 50 g |
|---|---|
| Mixture of 70 parts of hexahydrophthalic anhydride and 30 parts of methylhexahydrophthalic anhydride | 45 g |
| BDMA | 0.25 g |
| Millisil QM W12 EST | 145 g |

Processing analogously to Example 1 with the following curing cycle: 2 h at 100° C. followed by 10 h at 140° C.

| Flexural test: | Modulus of elasticity (MPa) | 10033 |
| --- | --- | --- |
| | σ-fracture (MPa) | 149 |
| Double torsion: | G1c (J/m²) | 656 |
| | K1c (MPa.m½) | 2.69 |

Example 4

Analogously to Example 1, a modified epoxy resin is prepared from 75.19 g of the aqueous emulsion prepared in Example D and 180 g of bisphenol A diglycidyl ether having an epoxide content of 5.4 equivalents/kg. The modified epoxy resin, which has a viscosity (Brookfield) of 2900 mPa·s at 40° C., is used to formulate a casting resin composition by mixing together the following components:

| Modified epoxy resin from Example 4 | 75 g |
| --- | --- |
| Millisil QM W12 | 123.8 g |
| Phenyldibenzylsulfonium hexafluoroantimonate (15% by weight solution in dibutyl phthalate) | 7.5 g |
| Byk A500 | 2 drops |

Processing analogous to Example 1.

| Flexural test: | Modulus of elasticity (MPa) | 8413 |
| --- | --- | --- |
| | σ-fracture (MPa) | 91 |
| Double torsion: | G1c (J/m²) | 350 |
| | K1c (MPa.m½) | 1.80 |

Example 5

Analogously to Example 1, a modified epoxy resin is prepared from 69.93 g of the aqueous emulsion prepared in Example E and 180 g of bisphenol A diglycidyl ether having an epoxide content of 5.4 equivalents/kg. The modified epoxy resin, which has a viscosity (Brookfield) of 2500 mPa·s at 40° C., is used to formulate a casting resin composition by mixing together the following components:

| Modified epoxy resin from Example 5. | 75 g |
| --- | --- |
| Millisil QM W12 | 123.8 g |
| Phenyldibenzylsulfonium hexafluoroantimonate (15% by weight solution in dibutyl phthalate) | 7.5 g |
| Byk A500 | 2 drops |

Processing analogous to Example 1.

| Flexural test | Modulus of elasticity (MPa) | 8538 |
| --- | --- | --- |
| | σ-fracture (MPa) | 100 |
| Double torsion: | G1c (J/m²) | 324 |
| | K1c (MPa.m½) | 1.74 |

Example 6

Analogously to Example 1, a modified epoxy resin is prepared from 75.47 g of the aqueous emulsion prepared in Example F and 180 g of bisphenol A diglycidyl ether having an epoxide content of 5.4 equivalents/kg. The modified epoxy resin, which has a viscosity (Brookfield) of 2370 mPa·s at 40° C., is used to formulate a casting resin composition by mixing together the following components:

Example 6A

Formulation of a casting resin composition analogously to Example 1 from:

| Modified epoxy resin from Example 6. | 75 g |
| --- | --- |
| Millisil QM W12 | 123.8 g |
| Phenyldibenzylsulfonium hexafluoroantimonate (15% by weight solution in dibutyl phthalate) | 7.5 g |
| Byk A500 | 2 drops |

Processing analogous to Example 1.

| Flexural test | Modulus of elasticity (MPa) | 8076 |
| --- | --- | --- |
| | σ-fracture (MPa) | 90 |
| Double torsion: | G1c (J/m²) | 370 |
| | K1c (MPa.m½) | 1.81 |

Example 6B

Formulation of a casting resin composition analogously to Example 1 from:

| Modified epoxy resin from Example 6. | 50 g |
| --- | --- |
| Mixture of 11 parts of carboxyl-terminated ester made form 2 mol of tetrahydrophthalic anhydride and 1 mol of neopentyl glycol, and 89 parts of methylhexahydrophthalic anhydride | 43.4 g |
| Melm | 0.13 g |
| Millisil QM W12 | 140 g |

Processing analogous to Example 1 with the following curing cycle: 2 h at 100° C., 10 h at 140° C. and then 2 h at 160° C.

| Flexural test: | Modulus of elasticity (MPa) | 8532 |
| --- | --- | --- |
| | σ-fracture (MPa) | 119 |
| Double torsion: | G1c (J/m²) | 498 |
| | K1c (MPa.m½) | 2.16 |

Example 7

Analogously to Example 1, a modified epoxy resin is prepared from 49.68 g of the aqueous emulsion prepared in Example F and 118.5 g of a liquid epoxy resin mixture having an epoxide content of 5.1 equivalents/kg which is obtained by mixing 91 parts by weight of bisphenol A diglycidyl ether and 9 parts by weight of polypropylene glycol (400) diglycidyl ether. The modified epoxy resin, which has a viscosity (Brookfield) of 10000 mPa·s at 25° C., is used to formulate a casting resin composition by mixing together the following components:

| Modified epoxy resin from Example 7 | 75 g |
|---|---|
| Millisil QM W12 | 123.8 g |
| Phenyldibenzylsulfonium hexafluoroantimonate | 7.5 g |
| (15% by weight solution in dibutyl phthalate) | |
| Byk A500 | 2 drops |

Processing analogous to Example 1.

| Flexural test: | Modulus of elasticity (MPa) | 8178 |
|---|---|---|
| | σ-fracture (MPa) | 109 |
| Double torsion: | G1c (J/m$^2$) | 581 |
| | K1c (MPa.m$^{1/2}$) | 2.29 |

Example 8

Analogously to Example 1, a modified epoxy resin is prepared from 37.31 g of the aqueous emulsion prepared in Example B and 90 g of a liquid epoxy resin mixture having an epoxide content of 5.3 equivalents/kg which is obtained by mixing 90 g of bisphenol A diglycidyl ether and bisphenol F diglycidyl ether having an epoxide content of 5.65 equivalents/kg and 10 g of polypropylene glycol (425). The modified epoxy resin, which has a viscosity (Brookfield) of 5290 mPa·s at 25° C., is used to formulate a casting resin composition by mixing together the following components:

| Modified epoxy resin from Example 8 | 75 g |
|---|---|
| Millisil QM W12 | 123.8 g |
| Phenyldibenzylsulfonium hexafluoroantimonate | 7.5 g |
| (15% by weight solution in dibutyl phthalate) | |
| Byk A500 | 2 drops |

Processing analogous to Example 1.

| Flexural test: | Modulus of elasticity (MPa) | 8562 |
|---|---|---|
| | σ-fracture (MPa) | 105 |
| Double torsion: | G1c (J/m$^2$) | 485 |
| | K1c (MPa.m$^{1/2}$) | 2.14 |

Example 9

Analogously to Example 1, a modified epoxy resin is prepared from 37.74 g of the aqueous emulsion prepared in Example F and 90 g of a liquid epoxy resin mixture of bisphenol A diglycidyl ether and bisphenol F diglycidyl ether having an epoxide content of 5.3 equivalents/kg. The modified epoxy resin, which has a viscosity (Brookfield) of 6050 mPa·s at 25° C., is used to formulate a casting resin composition by mixing together the following components:

| Modified epoxy resin from Example 9 | 75 g |
|---|---|
| Millisil QM W12 | 123.8 g |
| Phenyldibenzylsulfonium hexafluoroantimonate | 7.5 g |
| (15% by weight solution in dibutyl phthalate) | |
| Byk A500 | 2 drops |

Processing analogous to Example 1.

| Flexural test: | Modulus of elasticity (MPa) | 8301 |
|---|---|---|
| | σ-fracture (MPa) | 104 |
| Double torsion: | G1c (J/m$^2$) | 685 |
| | K1c (MPa.m$^{1/2}$) | 2.50 |

Example 10

Analogously to Example 1, a modified epoxy resin is prepared from 87.81 g of the aqueous emulsion prepared in Example G and 220.5 g of a liquid epoxy resin mixture of bisphenol A diglycidyl ether and bisphenol F diglycidyl ether having an epoxide content of 5.3 equivalents/kg. The modified epoxy resin, which has a viscosity (Brookfield) of 6280 mPa·s at 25° C., is used to formulate a casting resin composition by mixing together the following components:

| Modified epoxy resin from Example 10 | 75 g |
|---|---|
| Millisil QM W12 | 123.8 g |
| Phenyldibenzylsulfonium hexafluoroantimonate | 7.5 g |
| (15% by weight solution in dibutyl phthalate) | |
| Byk A500 | 2 drops |

Processing analogous to Example 1.

| Flexural test: | Modulus of elasticity (MPa) | 8322 |
|---|---|---|
| | σ-fracture (MPa) | 110 |
| Double torsion: | G1c (J/m$^2$) | 857 |
| | K1c (MPa.m$^{1/2}$) | 2.80 |

Example 11

Analogously to Example 1, a modified epoxy resin is prepared from 37.31 g of the aqueous emulsion prepared in Example B and 90 g of diglycidyl hexahydrophthalate having an epoxide content of 6.04 equivalents/kg. The modified epoxy resin, which has a viscosity (Brookfield) of 1380 mPa·s at 25° C., is used to formulate a casting resin composition by mixing together the following components:

| Modified epoxy resin from Example 11 | 50 g |
|---|---|
| Mixture of 70 parts of hexahydrophthalic anhydride and 30 parts of methylhexahydrophthalic anhydride | 45 g |
| BDMA | 0.25 g |
| Millisil QM W12 EST | 140 g |

Processing analogous to Example 1 with the following curing cycle: 2 h at 100° C. followed by 10 h at 140° C.

| Flexural test: | Modulus of elasticity (MPa) | 9831 |
|---|---|---|
| | σ-fracture (MPa) | 151 |
| Double torsion: | G1c (J/m$^2$) | 671 |
| | K1c (MPa.m$^{1/2}$) | 2.69 |

Example 12

Analogously to Example 1, a modified epoxy resin is prepared from 37.31 g of the aqueous emulsion prepared in Example B and 90 g of a liquid epoxy resin of bisphenol A diglycidyl ether and bisphenol F diglicidyl ether having an epoxide content of 5.78 equivalents/kg. The modified epoxy resin, which has a viscosity (Brookfield) of 1540 mPa·s at 25° C., is used to formulate a casting resin composition by mixing together the following components:

| | |
|---|---|
| Modified epoxy resin from Example 12 | 75 g |
| Millisil QM W12 | 123.8 g |
| Phenyldibenzylsulfonium hexafluoroantimonate (15% by weight solution in dibutyl phthalate) | 7.5 g |
| Byk A500 | 2 drops |

Processing analogous to Example 1.

| | | |
|---|---|---|
| Flexural test: | Modulus of elasticity (MPa) | 8799 |
| | σ-fracture (MPa) | 101 |
| Double torsion: | G1c (J/m$^2$) | 398 |
| | K1c (MPa.m$^{1/2}$) | 1.96 |

Example 13

1648 g of the aqueous emulsion prepared in Example G, having a solids content of 27.3% by weight, are added to 1800 g of 3,4-epoxycyclohexyl 3',4'-epoxycyclohexanecarboxylate, and the components are mixed by means of a mechanical stirrer. The water in the mixture is removed by distillation under reduced pressure at 70° C. (bath temperature). The remaining water is removed in a high vacuum. The resultant modified epoxy resin, having a viscosity (Brookfield) of 2190 mPa·s at 40° C., is used to formulate a casting resin composition by mixing together the following components:

Example 13A

Formulation of a casting resin composition analogous to Example 1 from:

| | |
|---|---|
| Modified epoxy resin from Example 13 | 37.5 g |
| Diglycidyl hexahydrophthalate (epoxide content = 6.04 equivalents/kg) | 37.5 g |
| Millisil QM W12 | 123.8 g |
| Phenyldibenzylsulfonium hexafluoroantimonate (15% by weight solution in dibutyl phthalate) | 7.5 g |
| Byk A500 | 2 drops |

Processing analogous to Example 1.

| | | |
|---|---|---|
| Flexural test: | Modulus of elasticity (MPa) | 9030 |
| | σ-fracture (MPa) | 106 |
| Double torsion: | G1c (J/m$^2$) | 490 |
| | K1c (MPa.m$^{1/2}$) | 2.21 |

Example 13B

Formulation of a casting resin composition analogous to Example 1 from:

| | |
|---|---|
| Modified epoxy resin from Example 13 | 33.02 g |
| Diglycidyl hexahydrophthalate (epoxide content = 6.04 equivalents/kg) | 33.02 g |
| Millisil QM W12 | 130 g |
| N-Benzylquinolinium hexafluoroantimonate | 2.18 g |
| Benzopinacol | 1.78 g |

Processing analogous to Example 1 with the following curing cycle: 1 h at 120° C. followed by 2 h at 140° C.

| | | |
|---|---|---|
| Flexural test: | Modulus of elasticity (MPa) | 11175 |
| | σ-fracture (MPa) | 142 |
| Double torsion: | G1c (J/m$^2$) | 442 |
| | K1c (MPa.m$^{1/2}$) | 2.33 |

Example 14

Analogously to Example 1, a modified epoxy resin is prepared from 88.34 g of the aqueous emulsion prepared in Example H and 225 g of bisphenol A diglycidyl ether having an epoxide content of 5.4 equivalents/kg. The modified epoxy resin, which has a viscosity (Brookfield) of 3090 mPa·s at 40° C., is used to formulate a casting resin composition by mixing together the following components:

Example 14A

Formulation of a casting resin composition analogous to Example 1 from:

| | |
|---|---|
| Modified epoxy resin from Example 14 | 75 g |
| Millisil QM W12 | 123.8 g |
| Phenyldibenzylsulfonium hexafluoroantimonate (15% by weight solution in dibutyl phthalate) | 7.5 g |
| Byk A500 | 2 drops |

Processing analogous to Example 1.

| | | |
|---|---|---|
| Flexural test: | Modulus of elasticity (MPa) | 8352 |
| | σ-fracture (MPa) | 105 |
| Double torsion: | G1c (J/m$^2$) | 405 |
| | K1c (MPa.m$^{1/2}$) | 1.93 |

Example 14B

Formulation of a casting resin composition analogous to Example 1 from:

| | |
|---|---|
| Modified epoxy resin from Example 14 | 50 g |
| Mixture of 11 parts of carboxyl-terminated ester made from 2 mol of tetrahydrophthalic anhydride and 1 mol of neopentyl glycol, and 89 parts of methylhexahydrophthalic anhydride | 43.4 g |

| | | |
|---|---|---|
| Melm | | 0.13 g |
| Millisil QM W12 | | 140 g |
| Byk A500 | | 2 drops |

Processing analogous to Example 1 with the following curing cycle: 2 h at 120° C., 10 h at 140° C. and then 2 h at 160° C.

| | | |
|---|---|---|
| Flexural test: | Modulus of elasticity (MPa) | 8723 |
| | σ-fracture (MPa) | 121 |
| Double torsion: | G1c (J/m$^2$) | 551 |
| | K1c (MPa.m$^{1/2}$) | 2.3 |

Example 15

Analogously to Example 1, a modified epoxy resin is prepared from 66.6 g of the aqueous emulsion prepared in Example I and 225 g of bisphenol A diglycidyl ether having an epoxide content of 5.4 equivalents/kg. The modified epoxy resin, which has a viscosity (Brookfield) of 3410 mPa·s at 40° C., is used to formulate a casting resin composition by mixing together the following components:

| | |
|---|---|
| Modified epoxy resin from Example 15 | 50 g |
| Mixture of 11 parts of carboxyl-terminated ester made from 2 mol of tetrahydrophthalic anhydride and 1 mol of neopentyl glycol, and 89 parts of methylhexahydrophthalic anhydride | 43.4 g |
| Melm | 0.13 g |
| Millisil QM W12 | 140 g |
| Byk A500 | 2 drops |

Processing analogous to Example 1 with the following curing cycle: 2 h at 120° C., 10 h at 140° C. and then 2 h at 160° C.

| | | |
|---|---|---|
| Flexural test: | Modulus of elasticity (MPa) | 8764 |
| | σ-fracture (MPa) | 117 |
| Double torsion: | G1c (J/m$^2$) | 498 |
| | K1c (MPa.m$^{1/2}$) | 2.19 |

Example 16

Analogously to Example 1, a modified epoxy resin is prepared from 65.2 g of the aqueous emulsion prepared in Example J and 270 g of a liquid epoxy resin mixture having an epoxide content of 5.1 equivalents/kg, where the epoxy resin mixture is obtained by mixing 91 parts by weight of bisphenol A diglycidyl ether and 9 parts by weight of polypropylene glycol (400) diglycidyl ether. The modified epoxy resin, which has a viscosity (Brookfield) of 2450 mPa·s at 40° C., is used to formulate a casting resin composition by mixing together the following components:

| | |
|---|---|
| Modified epoxy resin from Example 16 | 100 g |
| Silane A137*) | 0.5 g |
| Millisil QM W12 | 156 g |
| Phenyldibenzylsulfonium hexafluoroantimonate (15% by weight solution in dibutyl phthalate) | 3.5 g |

*)Octyltriethoxysilane from Osi Specialties

Processing analogous to Example 1.

| | | |
|---|---|---|
| Flexural test: | Modulus of elasticity (MPa) | 8280 |
| | σ-fracture (MPa) | 100 |
| Double torsion: | G1c (J/m$^2$) | 408 |
| | K1c (MPa.m$^{1/2}$) | 1.93 |

Example 17

990 g of a solid epoxy resin made from bisphenol A diglycidyl ether having an epoxide content of 1.7 equivalents/kg is melted at 150° C. (external temperature). 393 g of the aqueous emulsion prepared in Example K are added, and the components are mixed by means of a stirrer. Water is removed by distillation under a gentle vacuum. The remaining water is subsequently removed at 170° C. in a high vacuum. The modified epoxy resin is used to formulate a casting resin composition by grinding the following components:

| | |
|---|---|
| Modified epoxy resin from Example 17 | 33.8 g |
| Phthalic anhydride | 6.2 g |
| Millisil QM W12 | 60 g |

The mixture, which has a viscosity of 100,000 mPa·s at 120° C., is melted at 160° C. and pressed into a mould at 160° C. The curing is carried out for 10 h at 140° C.

| | | |
|---|---|---|
| Flexural test: | Modulus of elasticity (MPa) | 8704 |
| | σ-fracture (MPa) | 141 |
| Double torsion: | G1c (J/m$^2$) | 1432 |
| | K1c (MPa.m$^{1/2}$) | 3.7 |

Example 18

20 g of the core/shell powder spray-dried as in Example K are added to 180 g of bisphenol A diglycidyl ether having an epoxide content of 5.4 equivalents/kg and dispersed by means of a Dispermat using glass beads at 2000 rpm for 30 min. The modified epoxy resin, which has a viscosity (Brookfield) of 5600 mPa·s at 40° C., is used to formulate a casting resin composition by mixing together the following components:

| | |
|---|---|
| Modified epoxy resin from Example 15 | 50 g |
| Mixture of 11 parts of carboxyl-terminated ester made from 2 mol of tetrahydrophthalic anhydride and 1 mol of neopentyl glycol, and 89 parts of methylhexahydrophthalic anhydride | 43.4 g |

-continued

| | | |
|---|---|---|
| Melm | | 0.13 g |
| Millisil QM W12 | | 140 g |

Processing analogous to Example 1 with the following curing cycle: 2 h at 120° C., 10 h at 140° C. and then 2 h at 160° C.

| | | |
|---|---|---|
| Flexural test: | Modulus of elasticity (MPa) | 8456 |
| | σ-fracture (MPa) | 112 |
| Double torsion: | G1c (J/m²) | 479 |
| | K1c (MPa.m$^{1/2}$) | 2.1 |

Example 19

Composition and preparation of a toughened moulding 180 g of a solid bisphenol A-diglycidyl ether having an epoxy content of 2.3 equivalents/kg are melted at 160° C. To the melt are added 71.43 g of the aqueous emulsion prepared in Example K, and the components are mixed by means of a stirrer. The water in the mixture is removed under low vacuum by distillation. The remaining water is removed in a high vacuum. The resultant modified epoxy resin is used to formulate a resin component by mixing the following components at 140° C.

| | |
|---|---|
| Modified epoxy resin from example 19 | 167.17 g |
| Silane A 187 *) | 0.75 g |
| Dye paste DW 07 **) | 0.3 g |
| Bayferrox red ***) | 0.45 g |
| Vetrotex 1320 ****) | 45.18 g |
| Millisil QZ 300 *****) | 286.15 g |

*) Glycidyloxypropyltrimethoxysilan from Osi Specialities
**) Dye paste from Ciba-Geigy AG
***) Iron oxide from Bayer AG
****) Glassfaser from Vetrotex Ltd.
*****) Quarz powder from Quarzwerke AG Thereafter the resin component is cooled to 100° C. 300 g of said resin component of are mixed at 100° C. with the following curing agent component consisting of 34.0 g of phthalic anhydride,
63.1 g of tetrahydrophthalic anhydride and
2.9 g of a reaction product from 1 mole phthalic anhydride, 1 mole of N-butylamine and 1 mole of morpholine.

In order to remove included air bubbles, the so-obtained casting resin composition is evacuated under a high vacuum at RT. The casting resin composition is poured into a mould heated to 170° C. and measuring 13.5×13.5×0.4 cm. Curing is carried out for 0.5 h at 170° C. and subsequently for 6 h at 135° C. The following properties are measured at the mouding:

| | | |
|---|---|---|
| Flexural test: | Modulus of elasticity (MPa) | 9319 |
| | σ-fracture (MPa) | 153 |
| Double torsion: | G1c (J/m²) | 1117 |
| | K1c (MPa.m$^{1/2}$) | 3.4 |

What is claimed is:

1. An epoxy resin composition comprising
   (a) an epoxy resin or epoxy resin mixture containing on average more than one 1,2-epoxide group in the molecule,
   (b) core/shell particles comprising a core comprising an elastomer having a $T_G$ value of <0° C. onto which a shell of a crosslinked copolymer is grafted, wherein the shell comprises at least one (meth)acrylate of formula I

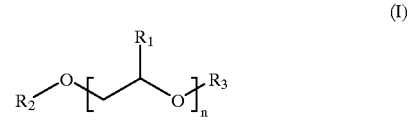

derived from polyethylene glycol or polypropylene glycol, in which either $R_2$ or $R_3$ is the radical

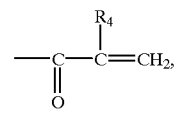

and the other radical is —H or alkyl, $R_1$ and $R_4$ are each —H, —CH$_3$, or —C$_2$H$_5$, and n is a number from 2 to 30, where the proportion of the crosslinking component in the copolymer of the shell is from 6 to 60% by weight, based on the total amount of the comonomers in the shell copolymer, and
   (c) a curing agent or a curing catalyst for the epoxy resin component (a).

2. An epoxy resin composition according to claim 1, wherein the epoxy resin (a) is a liquid or solid polyglycidyl ether or ester.

3. An epoxy resin composition according to claim 1, comprising core/shell particles (b) in which the core comprises a crosslinked elastomer having a $T_G$ value of <−10° C.

4. An epoxy resin composition according to claim 1, comprising core/shell particles (b) in which the core comprises a polybutadiene or poly(meth)acrylate.

5. An epoxy resin composition according to claim 1, comprising core/shell particles (b) in which the shell comprises a crosslinked copolymer in which the crosslinking component is a di(meth)acrylate of ethylene glycol, propylene glycol, butylene glycol or a higher homologue thereof having up to 30 recurring structural units of the formula

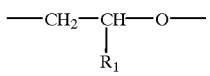

in the molecule, in which $R^1$ is —H, —CH$_3$, or —C$_2$H$_5$, or 1,1,1-trimethylolpropane tri(meth)acrylate, bisphenol A diglycidyl ether di(meth)acrylate or allyl methacrylate.

6. An epoxy resin composition according to claim 1, comprising core/shell particles in amounts of 1–50% by weight, based on the total amount of components (a), (b) and (c).

7. An epoxy resin composition according to claim 1, wherein component (c) is a polycarboxylic acid or anhydride, a polyamine, dicyandiamide or a catalytically acting curing agent.

8. A moulded material, coating or adhesive bond system produced from an epoxy resin composition according to claim 1 by curing.

9. An encapsulating system or coating composition comprising
(a) an epoxy resin or epoxy resin mixture containing on average more than one 1,2-epoxide group in the molecule,
(b) core/shell particles comprising a core comprising an elastomer having a $T_G$ value of <0° C. onto which a shell of a crosslinked copolymer is grafted, in which the shell comprises at least one meth)acrylate of formula I

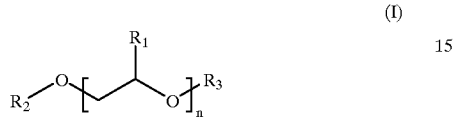
(I)

derived from polyethylene glycol or polypropylene glycol, in which either $R_2$ or $R_3$ is the radical

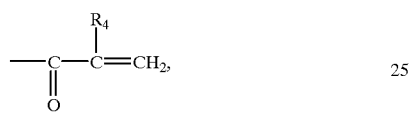

and the other radical is —H or alkyl, $R_1$ and $R_4$ are each —H, —CH$_3$, or —C$_2$H$_5$, and n is a number from 2 to 30, where the proportion of the crosslinking component in the copolymer of the shell is from 6 to 60% by weight, based on the total amount of the comonomers in the shell copolymer, and
(c) a curing agent or a curing catalyst for the epoxy resin component (a), and
(d) at least one mineral filler suitable in epoxy resin technology.

10. An epoxy casting resin composition comprising
(a) an epoxy resin or epoxy resin mixture containing on average more than one 1,2-epoxide group in the molecule,
(b) core/shell particles comprising a core comprising an elastomer having a $T_G$ value of <0° C. onto which a shell of a crosslinked copolymer is grafted, in which the shell comprises at least one (meth)acrylate of formula I

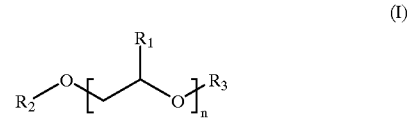
(I)

derived from polyethylene glycol or polypropylene glycol, in which either $R_2$ or $R_3$ is the radical

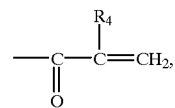

and the other radical is —H or alkyl, $R_1$ and $R_4$ are each —H, —CH$_3$, or —C$_2$H$_5$, and n is a number from 2 to 30, where the proportion of the crosslinking component in the copolymer of the shell is from 6 to 60% by weight, based on the total amount of the comonomers in the shell copolymer, and
(c) a curing agent or a curing catalyst for the epoxy resin component (a), and
(d) at least one mineral filler suitable in epoxy casting resin technology.

* * * * *